United States Patent
Ahn et al.

(10) Patent No.: US 9,319,205 B2
(45) Date of Patent: Apr. 19, 2016

(54) METHOD AND APPARATUS FOR PERFORMING CROSS-CARRIER SCHEDULING FOR SPS

(75) Inventors: Joon Kui Ahn, Anyang-si (KR); Seung Hee Han, Anyang-si (KR); Min Seok Noh, Anyang-si (KR); Min Gyu Kim, Anyang-si (KR); Jae Hoon Chung, Anyang-si (KR); Sung Ho Moon, Anyang-si (KR); Suck Chel Yang, Anyang-si (KR); Dong Youn Seo, Anyang-si (KR); So Yeon Kim, Anyang-si (KR)

(73) Assignee: LG ELECTRONICS INC., Seoul (KR)

(*) Notice: Subject to any disclaimer, the term of this patent is extended or adjusted under 35 U.S.C. 154(b) by 304 days.

(21) Appl. No.: 13/634,481

(22) PCT Filed: Mar. 10, 2011

(86) PCT No.: PCT/KR2011/001674
§ 371 (c)(1),
(2), (4) Date: Sep. 12, 2012

(87) PCT Pub. No.: WO2011/115389
PCT Pub. Date: Sep. 22, 2011

(65) Prior Publication Data
US 2013/0058291 A1    Mar. 7, 2013

Related U.S. Application Data

(60) Provisional application No. 61/314,989, filed on Mar. 17, 2010.

(51) Int. Cl.
*H04W 4/00* (2009.01)
*H04L 5/00* (2006.01)
(Continued)

(52) U.S. Cl.
CPC .............. *H04L 5/0091* (2013.01); *H04L 5/001* (2013.01); *H04L 5/0007* (2013.01); *H04L 5/0053* (2013.01); *H04W 72/04* (2013.01); *H04L 1/18* (2013.01); *H04W 84/047* (2013.01)

(58) Field of Classification Search
CPC ............ H04W 72/042; H04W 74/006; H04W 72/01278; H04W 72/04; H04L 5/001; H04L 5/0091–5/0098; H04L 5/0053; H04L 1/18; H04L 1/1896; H04L 5/0007
USPC .................. 370/252, 328, 329, 336; 455/434; 714/751

See application file for complete search history.

(56) References Cited

U.S. PATENT DOCUMENTS

2009/0298493 A1    12/2009  Lin
2010/0031111 A1*   2/2010  Cai .................. H04L 1/1896
                                                      714/751

(Continued)

FOREIGN PATENT DOCUMENTS

EP        2 131 622 A1    12/2009
KR   10-2009-0126203 A    12/2009

(Continued)

*Primary Examiner* — Kwang B Yao
*Assistant Examiner* — Harun Chowdhury
(74) *Attorney, Agent, or Firm* — Birch, Stewart, Kolasch & Birch, LLP

(57) ABSTRACT

The present invention relates to a wireless communication system. More particularly, the present invention relates to a method and apparatus in which a base station transmits a signal to a relay in a wireless communication system. A method in which a terminal receives a downlink signal in a wireless communication system that supports carrier aggregation comprises: a step of receiving, on a first carrier, a physical downlink control channel (PDCCH) having no carrier indication information; and a step of receiving a physical downlink shared channel (PDSCH) using the scheduling information carried on the PDCCH, wherein the PDSCH is received on the first carrier in the event the PDCCH is a non-semi-persistent scheduling (SPS) PDCCH, and the PDSCH is received on a second carrier different from the first carrier in the event the PDCCH is an SPS PDCCH.

4 Claims, 17 Drawing Sheets

(51) Int. Cl.
*H04W 72/04* (2009.01)
*H04W 84/04* (2009.01)
*H04L 1/18* (2006.01)

(56) References Cited

U.S. PATENT DOCUMENTS

2010/0322175 A1* 12/2010 Chen .............................. 370/329
2011/0105136 A1* 5/2011 Choi .......................... 455/452.1
2011/0141985 A1* 6/2011 Larsson et al. ................. 370/329
2011/0188428 A1 8/2011 Ishii
2012/0009923 A1* 1/2012 Chen ..................... H04L 5/0091
455/434
2013/0051214 A1* 2/2013 Fong et al. ..................... 370/216

FOREIGN PATENT DOCUMENTS

KR 10-2011-0044875 A 5/2011
WO 2010/018819 A1 2/2010

* cited by examiner

Note: In case of UL SPS, PUSCH is transmitted on
UL carrier indicated by CI information [S806]
or UL carrier linked with first DL carrier [S808].

Note: In case of UL scheduling, PUSCH is transmitted on UL carrier indicated by CI information [S1106] or UL carrier linked with first DL carrier [S1108].

Moreover, SPS PUSCH is transmitted on UL carrier indicated by CI information [S1112] or UL carrier having SPS transmission performed thereon recently [S1114].

Note: In case of UL scheduling, PUSCH is transmitted on UL carrier indicated by CI information [S1406] or UL carrier linked with first DL carrier [S1408].

Moreover, SPS PUSCH is transmitted on UL carrier indicated by CI information [S1412] or UL primary carrier [S1414].

METHOD AND APPARATUS FOR PERFORMING CROSS-CARRIER SCHEDULING FOR SPS

CROSS REFERENCE TO RELATED APPLICATIONS

This application is the National Phase of PCT/KR2011/001674 filed on Mar. 10, 2011, which claims priority under 35 U.S.C. §119(e) to U.S. Provisional Application No. 61/314,989 filed on Mar. 17, 2010, all of which are hereby expressly incorporated by reference into the present application.

TECHNICAL FIELD

The present invention relates to a wireless communication, and more particularly, to a method of performing cross-carrier scheduling for SPS (semi-persistent scheduling) and apparatus therefor.

BACKGROUND ART

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may include one of CDMA (code division multiple access) system, FDMA (frequency division multiple access) system, TDMA (time division multiple access) system, OFDMA (orthogonal frequency division multiple access) system, SC-FDMA (single carrier frequency division multiple access) system and the like.

DISCLOSURE OF THE INVENTION

Technical Tasks

One object of the present invention is to provide a method and apparatus for efficiently performing cross-carrier scheduling in a wireless communication system. In particular, the object of the present invention is to provide a method and apparatus for efficiently performing cross-carrier scheduling for SPS.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, a method of receiving a downlink signal by a user equipment in a carrier aggregation supportive wireless communication system, according to one embodiment of the present invention may include the steps of receiving a PDCCH (physical downlink control channel) with no carrier indication information via a first carrier and receiving a PDSCH (physical downlink shared channel) using a scheduling information carried on the PDCCH, wherein if the PDCCH is a non-SPS (non-semi-persistent scheduling) PDCCH, the PDSCH is received on the first carrier and wherein if the PDCCH is an SPS PDCCH, the PDSCH is received on a second carrier different from the first carrier.

To further achieve these and other advantages and in accordance with the purpose of the present invention, a user equipment configured to receive a downlink signal in a carrier aggregation supportive wireless communication system, according to one embodiment of the present invention may include an RF (radio frequency) unit and a processor configured to receive a PDCCH (physical downlink control channel) with no carrier indication information via a first carrier, the processor configured to receive a PDSCH (physical downlink shared channel) using a scheduling information carried on the PDCCH, wherein if the PDCCH is a non-SPS (non-semi-persistent scheduling) PDCCH, the PDSCH is received on the first carrier and wherein if the PDCCH is an SPS PDCCH, the PDSCH is received on a second carrier different from the first carrier.

Preferably, the second carrier may include a carrier on which a latest SPS transmission has been performed.

Preferably, the second carrier may include a primary carrier.

Preferably, the PDCCH is received via a common search space.

Preferably, the non-SPS PDCCH has a CRC (cyclic redundancy check) masked with a C-RNTI (cell-radio network temporary identifier) and the SPS PDCCH has a CRC masked with an SPS C-RNTI.

Advantageous Effects

According to embodiments of the present invention, cross-carrier scheduling can be efficiently performed in a wireless communication system. In particular, cross-carrier scheduling for SPS can be efficiently performed.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE FOR INVENTION

First of all, the following descriptions are usable for various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented by such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE adopts OFDMA in DL and SC-FDMA in UL.

For clarity, the following description mainly concerns 3GPP LTE/LTE-A, by which the present invention may be non-limited.

Figure 1:
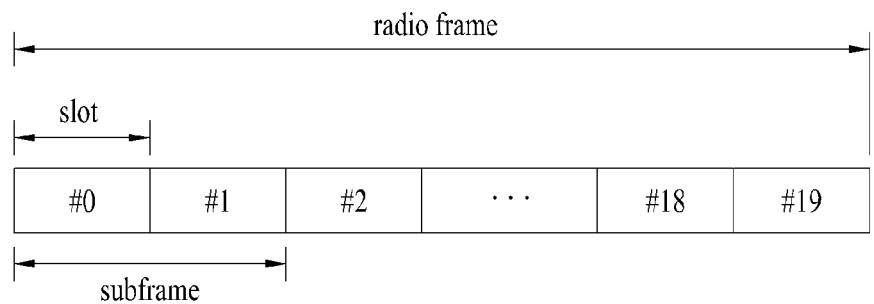
FIG. 1 is a diagram for one example of a structure of a radio frame.

FIG. 1 is a diagram for one example of a structure of a radio frame used by E-UMTS system.

Referring to FIG. 1, an E-UMTS system uses a radio frame of 10 ms. And, one radio frame includes 10 subframes. Each of the subframes includes 2 slots contiguous with each other. One slot may have a length of 0.5 ms and may be constructed with a plurality of symbols (e.g., OFDM (orthogonal frequency division multiplexing) symbols, SC-FDMA (single carrier frequency division multiple access) symbols).

Figure 2:
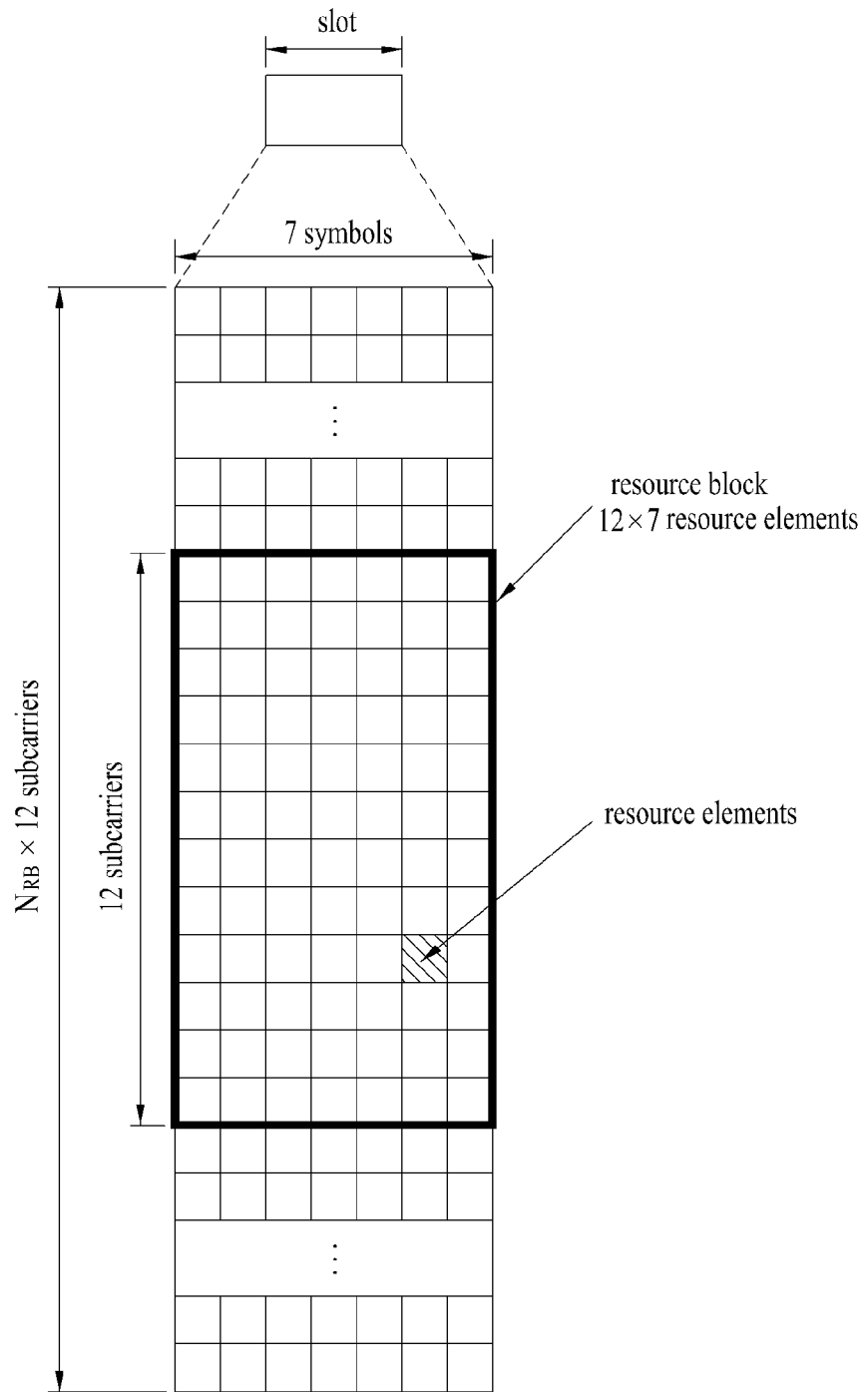
FIG. 2 is a diagram for one example of a resource grid of a radio frame.

FIG. 2 is a diagram for one example of a resource grid of a lot.

Figure 3:
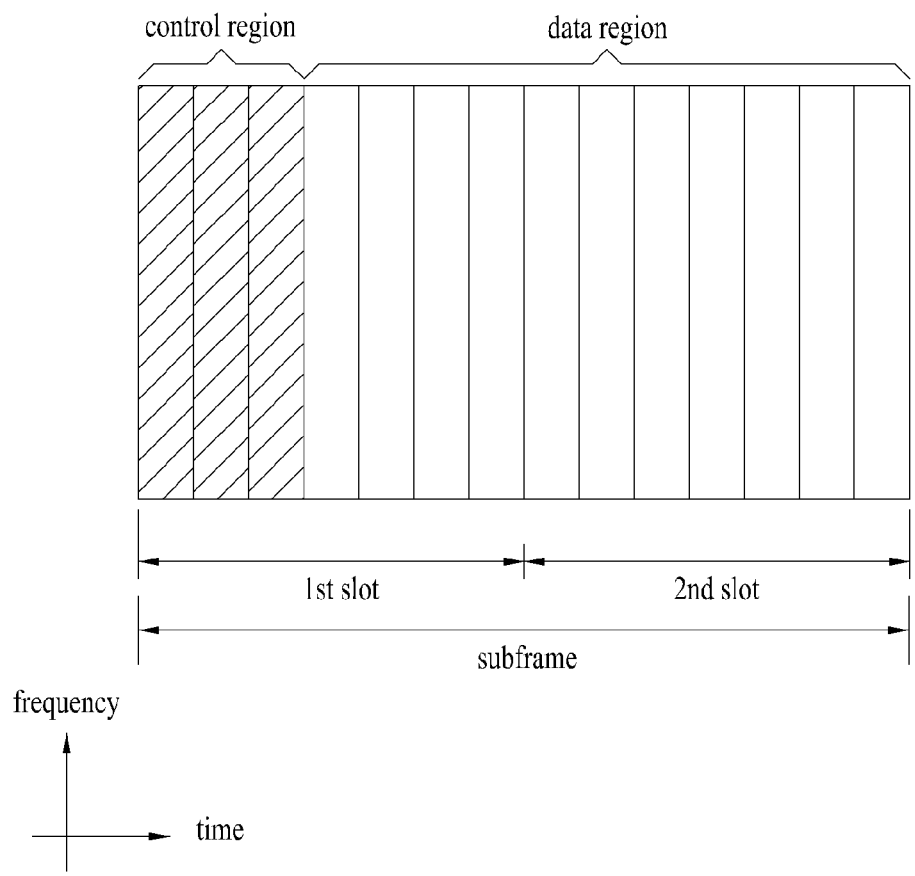
FIG. 3 is a diagram for a structure of a downlink (hereinafter abbreviated DL) subframe.

Referring to FIG. 2, a slot includes a plurality of OFDM symbols or SC-FDMA symbols and also includes a plurality of resource blocks (RBs) in frequency domain. On resource block includes 12×6 or 12×7 resource elements (REs). The number $N_{RB}$ of RBs included in a time slot depends on a transmission bandwidth configured in a cell. Each box in the resource grid indicates a minimum resource defined by one symbol and one subcarrier, which is called a resource element (RE). FIG. 3 exemplarily shows that a time slot and a resource block include 7 symbols and 12 subcarriers, respectively, by which the present invention may be non-limited. For instance, the number of symbols included in a slot may be variable depending on a length of a cyclic prefix (hereinafter abbreviated CP).

FIG. 3 is a diagram for a structure of a DL subframe.

Referring to FIG. 3, maximum 3 or 4 OFDM symbols situated at a head part of a first slot of a subframe correspond to a control region to which a control channel is assigned. And, the rest of OFDM symbols correspond to a data region to which PDSCH (physical downlink shared channel) is assigned. For example, DL control channels used by 3GPP LTE may include PCFICH (Physical Control Format Indicator Channel), PDCCH (Physical Downlink Control Channel), PHICH (Physical hybrid ARQ indicator Channel) and the like. The PCFICH is transmitted on a first OFDM symbol of a subframe and carries information on the number of OFDM symbols used for a control channel transmission in the subframe. The PHICH carries HARQ ACK/NACK (acknowledgment/negative-acknowledgment) signal in response to a UL transmission.

Control information transmitted on PDCCH is called DCI (downlink control information). The DCI includes a resource allocation information for a user equipment or a user equipment group and other control informations. For instance, the DCI includes UL/DL scheduling information, UL transmit (Tx) power control command and the like. In particular, in order to receive DL data, a user equipment reads DL scheduling information from PDCCH and then receives DL data on PDSCH using resource allocation information indicated by the DL scheduling information. Moreover, in order to transmit UL data, a user equipment reads UL scheduling information from PDCCH and then transmits UL data on PUSCH (physical uplink shared channel) using resource allocation information indicated by the DL scheduling information. The PUSCH shall be described later.

PDCCH carries transmit format and resource allocation information of DL-SCH (downlink shared channel), transmit format and resource allocation information of UL-SCH (uplink shared channel), paging information on PCH (paging channel), system information on DL-SCH, resource allocation information of a higher-layer control message such as a random access response transmitted on PDSCH, Tx power control command set for individual user equipments within a user equipment group, Tx power control command, activation indication information of VoIP (voice over IP) and the like. A plurality of PDCCHs may be transmitted in a control region. A user equipment may be able to monitor a plurality of PDCCHs. PDCCH is transmitted on aggregation of at least one or more contiguous CCEs (control channel elements). In this case, the CCE is a logical assignment unit used to provide PDCCH with a coding rate based on a radio channel state. The CCE corresponds to a plurality of REGs (resource element groups). PDCCH format and the number of PDCCH bits are determined depending on the number of CCEs. A base station determines PDCCH format in accordance with DCI to transmit to a user equipment and attaches CRC (cyclic redundancy check) to control information. The CRC is masked with an identifier (e.g., RNTI (radio network temporary identifier)) in accordance with an owner or a purpose of use. For instance, if PDCCH is provided for a specific user equipment, CRC may be masked with an identifier (e.g., C-RNTI (cell-RNTI)) of the corresponding user equipment. If PDCCH is provided for a paging message, CRC may be masked with a paging identifier (e.g., P-RNTI (paging-RNTI)). If PDCCH s provided for system information (particularly, SIC (system information block)), CRC may be masked with SI-RNTI (system information-RNTI). And, if PDCCH is provided for a random access response, CRC may be masked with RA-RNTI (random access-RNTI).

Figure 4:
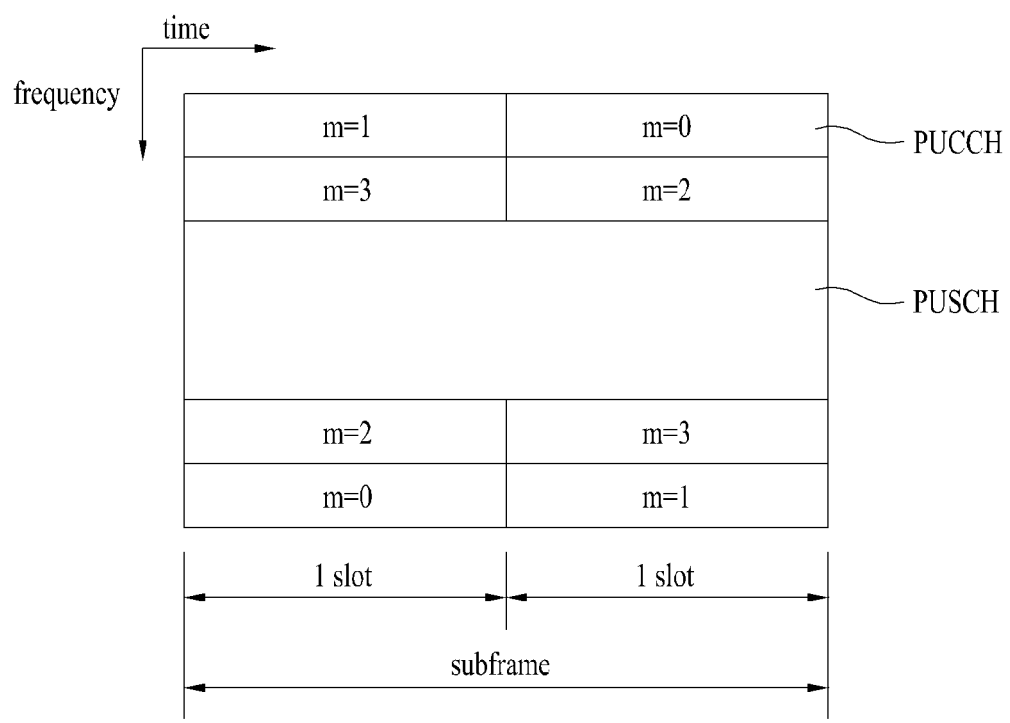
FIG. 4 is a diagram for one example of a structure of an uplink (hereinafter abbreviated UL) subframe.

FIG. 4 is a diagram for one example of a structure of a UL subframe used by LTE.

Referring to FIG. 4, a UL frame includes a plurality of slots (e.g., 2 slots). Each of the slots may include a different number of SC-FDMA symbols in accordance with a CP length. The UL subframe may be divided into a data region and a control region in frequency domain. The data region includes PUSCH and is used to transmit such a data signal as an audio and the like. The control region includes PUCCH and is used to transmit UL control information (UCI). The PUCCH includes an RB pair situated at both ends of the data region and performs hopping over the boundary of a slot. The UL control information includes SR (scheduling request) to request an uplink resource, HARQ ACK/NACK (hybrid automatic repeat and request acknowledgement/negative acknowledgement) for DL data packet, DL channel information and the like. In particular, the DL channel information may include PMI (precoding matrix indicator), RI (rank indicator) and CQI (channel quality indicator).

PDCCH Structure

PDCCH carries a message known as DCI. N general, a plurality of PDCCHs are transmitted in a subframe. Each of the PDCCHs is transmitted using at least one CCE. One CCE corresponds to 9 REGs. And, each of the REGs corresponds to 4 REs. 4 QPSK symbols are mapped to each of the REGs. A resource element occupied by a reference signal is not included in the REG. Hence, the number of REGs in a given OFDM symbol varies depending on whether a cell-specific reference signal is present. The REG concept is available for other DL control channels (e.g., PDFICH, PHICH, etc.). And, 4 PDCCH formats are supported as shown in Table 1.

TABLE 1

| PDCCH format | Number of CCEs (n) | Number of REGs | Number of PDCCH bits |
| --- | --- | --- | --- |
| 0 | 1 | 9 | 72 |
| 1 | 2 | 18 | 144 |
| 2 | 4 | 36 | 288 |
| 3 | 8 | 72 | 576 |

CCEs are contiguously used by being numbered. In order to simplify a decoding process, PDCCH having a format configured with n CCEs is allowed to start with the CCE having the number corresponding to a multiple of n only. The number of CCEs used for a transmission of specific PDCCH is determined by a base station in accordance with a channel state. For instance, one CCE may be enough for PDCCH for a user equipment (e.g., a user equipment adjacent to a base station) having a good DL channel. Yet, in order to obtain sufficient robustness, 8 CCEs may be required for PDCCH for a user equipment (e.g., a user equipment located in the vicinity of a cell boundary) having a poor channel. Moreover, a power level of PDCCH may be adjusted to fit for a channel state.

PDCCH Transmission & Blind Decoding

In LTE, defined is a CCE set enabling PDCCH to be situated for each user equipment. CCE set, in which a user equipment is able to find its PDCCH, is called a PDCCH search space or a search space in brief. A search space for each PDCCH format in LTE may have a different size. A dedicated or UE-specific (user equipment-specific) search space and a common search space are defined. The dedicated search space is configured for each individual user equipment and all user equipments are provided with information on a range of the common search space. The dedicated search space and the common search space may overlap with each other.

As search spaces are small in size and may possibly overlap with each other, it may be impossible for a base station to find a CCE resource to send down PDCCH to all desired user equipments in a given subframe. This is because of the following reason. Namely, since CCE resource is already allocated to another user equipment, a CCE resource for a specific user equipment may not exist in a search space for the specific user equipment [blocking]. In order to minimize the possibility of the blocking that may continue in a next subframe, a UE-specific hopping sequence is applied to a start position of a dedicated search space. Table 2 shows sizes of a common search space and a dedicated search space.

TABLE 2

| PDCCH format | Number of CCEs (n) | Number of candidates in common search space | Number of candidates in dedicated search space |
| --- | --- | --- | --- |
| 0 | 1 | — | 6 |
| 1 | 2 | — | 6 |
| 2 | 4 | 4 | 2 |
| 3 | 8 | 2 | 2 |

In order to control an operation load due to a total count of BD (blind) attempts, a user equipment does not search all the defined DCI formats at the same time. Generally, a user equipment searches a dedicated search space for Format 0 and Format 1A. In particular, Format 0 and Format 1A are equal to each other in size and may be discriminated from each other by flags in a message. Moreover, the user equipment may be requested to receive another format (e.g., Format 1, Format 1B or Format 2 in accordance with PDSCH transmission mode set by a base station) in addition. A user equipment searches Format 1A and Format 1C in a common search space. And, the user equipment may be configured to search for Format 3 or Format 3A. In particular, like Format 0 and Format 1A, Format 3 and Format 3A are equal to each other in size and may be discriminated from each other depending on whether to have a CRC scrambled with a different (common) identifier. In the following description, transmission modes and information contents of DCI formats for the configuration of MIMO (multi-antenna) technology are explained.

Transmission Mode

Transmission mode 1: Transmission from a single base station antenna port

Transmission mode 2: Transmit diversity

Transmission mode 3: Open-loop spatial multiplexing

Transmission mode 4: Closed-loop spatial multiplexing

Transmission mode 5: Multi-user MIMO

Transmission mode 6: Closed-loop rank-1 precoding

Transmission mode 7: Transmission using UE-specific reference signals

DCI Format

Format 0: Resource grants for the PUSCH transmissions (uplink)

Format 1: Resource assignments for single codeword PDSCH transmissions (transmission modes 1, 2 and 7)

Format 1A: Compact signaling of resource assignments for single codeword PDSCH (all modes)

Format 1B: Compact resource assignments for PDSCH using rank-1 closed loop precoding (mode 6)

Format 1C: Very compact resource assignments for PDSCH (e.g. paging/broadcast system information)

Format 1D: Compact resource assignments for PDSCH using multi-user MIMO (mode 5)

Format 2: Resource assignments for PDSCH for closed-loop MIMO operation (mode 4)

Format 2A: Resource assignments for PDSCH for open-loop MIMO operation (mode 3)

Format 3/3A: Power control commands for PUCCH and PUSCH with 2-bit/1-bit power adjustments Considering the above description, a user equipment performs BD 44 times to the maximum in any subframe. A count of the BDs does not include an action of checking a same message with different CRC values, which may require small additional operation complexity.

HARQ (Hybrid Automatic Repeat and reQuest)

In a wireless communication system, if a plurality of user equipments are present by having data to transmit in UL/DL, a base station selects the user equipment to transmit data each TTI (transmission time interval) (e.g., subframe). In particular, in a multicarrier system or a system operating in a manner similar to that of the multicarrier system, a base station selects user equipments to transmit data in UL/DL each TTI and also selects a frequency band to be used for the data transmission by each of the selected user equipments.

The following description is made with reference to UL (uplink). First of all, user equipments transmit reference signals (or pilots) in UL. Using the reference signals transmitted from the user equipments, a base station obtains channel sates of the user equipments and then selects user equipments to transmit data in UL on each unit frequency band each TTI. The base station then informs the user equipment of the corresponding result. In particular, the base station sends a UL assignment message, which indicates to send data using a specific frequency band, to the user equipment UL-scheduled in specific TTI. In this case, the UL assignment message may be called a UL grant. In accordance with UL assignment message, the user equipment transmits data in UL. The UL assignment message basically contains information on UE ID (identity), RB assignment information, payload and the like and may further contain IR (incremental redundancy) version, NDI (new data indication) and the like.

In case that synchronous non-adaptive HARQ is applied, when a user equipment scheduled in a specific time performs a retransmission, a retransmission time is systematically promised (e.g., after 4 subframes from NAC received time, etc.). Hence, a UL grant message sent to a user equipment by a base station only need to be sent in an initial transmission and a retransmission in the future is triggered by ACK/NACK signal. On the other hand, in case that asynchronous adaptive HARQ is applied, since a retransmission time is not promised in-between, a base station should send a retransmission request message to a user equipment. Moreover, since a frequency resource or MCS for a retransmission varies in each transmission time, when a base station sends a retransmission request message, the base station should transmit HARQ process index, IR version and NDI information together with UE ID, RB assignment information and payload.

Figure 5:
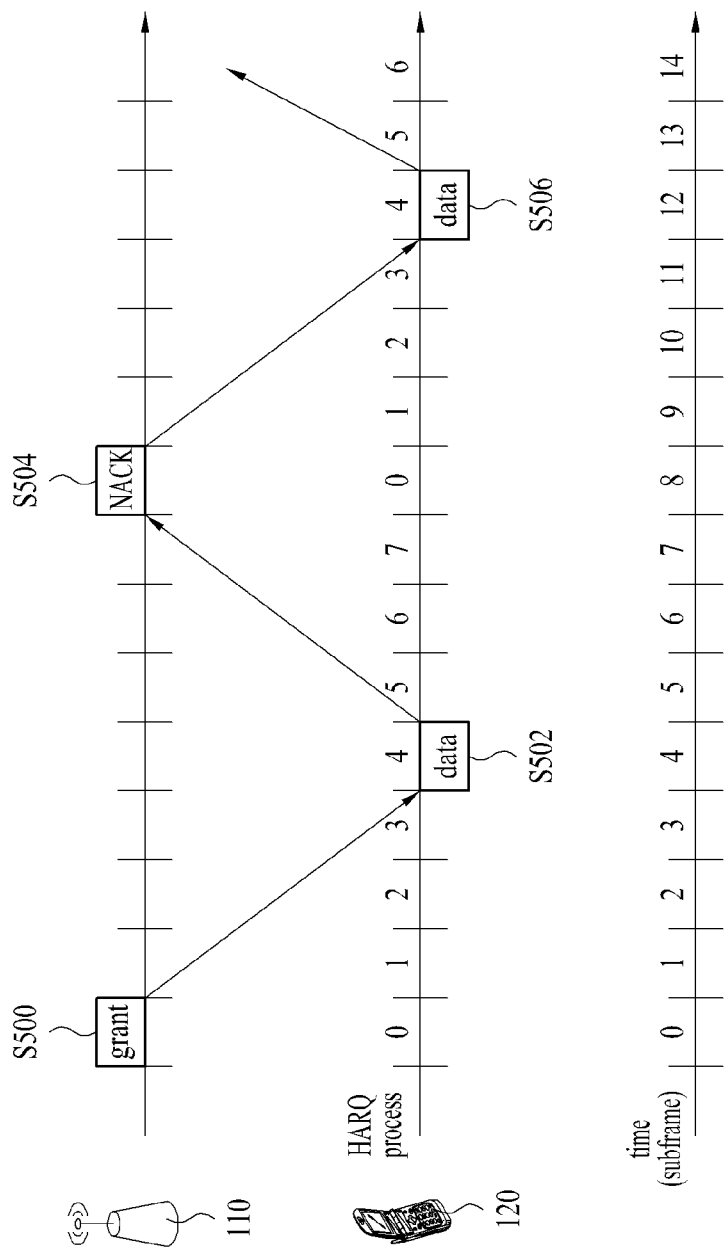
FIG. 5 is a diagram for one example of UL HARQ (uplink hybrid automatic repeat request) operation.

FIG. 5 is a diagram for one example of UL HARQ (uplink hybrid automatic repeat request) operation. In LTE system, HARQ uses synchronous non-adaptive HARQ. In case of using 8-channel HARQ, HARQ process numbers are given as 0 to 7. When a user equipment is scheduled to transit data in a process #1, when the user equipment performs a retransmission, the user equipment may be able to perform HARQ retransmission of the corresponding data in a process time #1 only. One HARQ process operates in each TTI (e.g., subframe, etc.).

Referring to FIG. 5, a base station 110 transmits a UL grant to a user equipment 120 on PDCCH [S500]. After duration of 4 subframes from a timing (e.g., subframe 0) of the reception of the UL grant [i.e., in subframe 4], the user equipment 120 transmits UL data to the base station 110 using RB and MCS designated by the UL grant [S502]. The base station 110 decodes the UL data received from the user equipment 120 and then creates ACK/NACK. If the base station 100 fails in decoding the UL data, the base station 110 transmits NACK to the user equipment 120 [S504]. After duration of 4 subframes from the timing of the NACK reception, the user equipment 120 retransmits the UL data [S506]. In doing so, the same HARQ processor (e.g., HARQ processor 4) is in charge of the initial transmission and retransmission of the UL data.

SPS (Semi-Persistent Scheduling)

Normal unicast data dynamically allocates resource in each subframe by scheduling. Yet, according to SPS, a reservation is made in advance for a traffic periodically generated with a middle/low-speed requested data rate like VoIP (Voice over Internet Protocol) or streaming. Hence, the SPS reduces scheduling overhead and stably allocates resources, in a manner of reserving a resource for a specific traffic in advance.

In case of DL/UL (uplink/downlink) SPS in LTE, information on a subframe for SPS transmission/reception (Tx/Rx) is given by RRC signaling. And, activation, reactivation and release of SPS are performed through PDCCH. The subframe information for SPS contains a subframe interval and a subframe offset. For clarity, PDCCH for indicating activation/reactivation/release of SPS is named SPS PDCCH. The SPS PDCCH carries RB assignment information for SPS Tx/Rx and MCS (modulation and coding scheme) information. The SPS PDCCH has a CRC (cyclic redundancy check) masked with SPS C-RNTI (cell-radio network temporary identifier). Hence, a user equipment does not perform SPS Tx/Rx immediately despite receiving information on a subframe for receiving SPS by RRC signaling. In case of receiving SPS PDCCH indicating SPS activation (or, SPS reactivation), a user equipment performs SPS Tx (e.g., PUSCH Tx) or SPS Rx (e.g., PDSCH reception) in a subframe assigned by RRC signaling. In the corresponding subframe, the SPS Tx/Rx is performed using RB assignment information and MCS information in the SPS PDCCH. Meanwhile, in case of receiving the PDCCH indicating the SPS release, the user equipment stops the SPS Tx/Rx. If the SPS PDCCH indicating the activation (or reactivation) is received, the stopped SPS Tx/Rx is resumed in the subframe assigned by RRC signaling using the RB assignment and MCS designated in the SPS PDCCH. Moreover, if 'reactivation' SPS is ordered for an active SPS via PDCCH, it may be able to change SPS transmission timing, assignment of RB to use, MCS and the like. Besides, in the active SPS, resource to be used for a retransmission of PDSCH/PUSCH, MCS and the like may be changed via PDCCH [reallocation].

Figure 6:
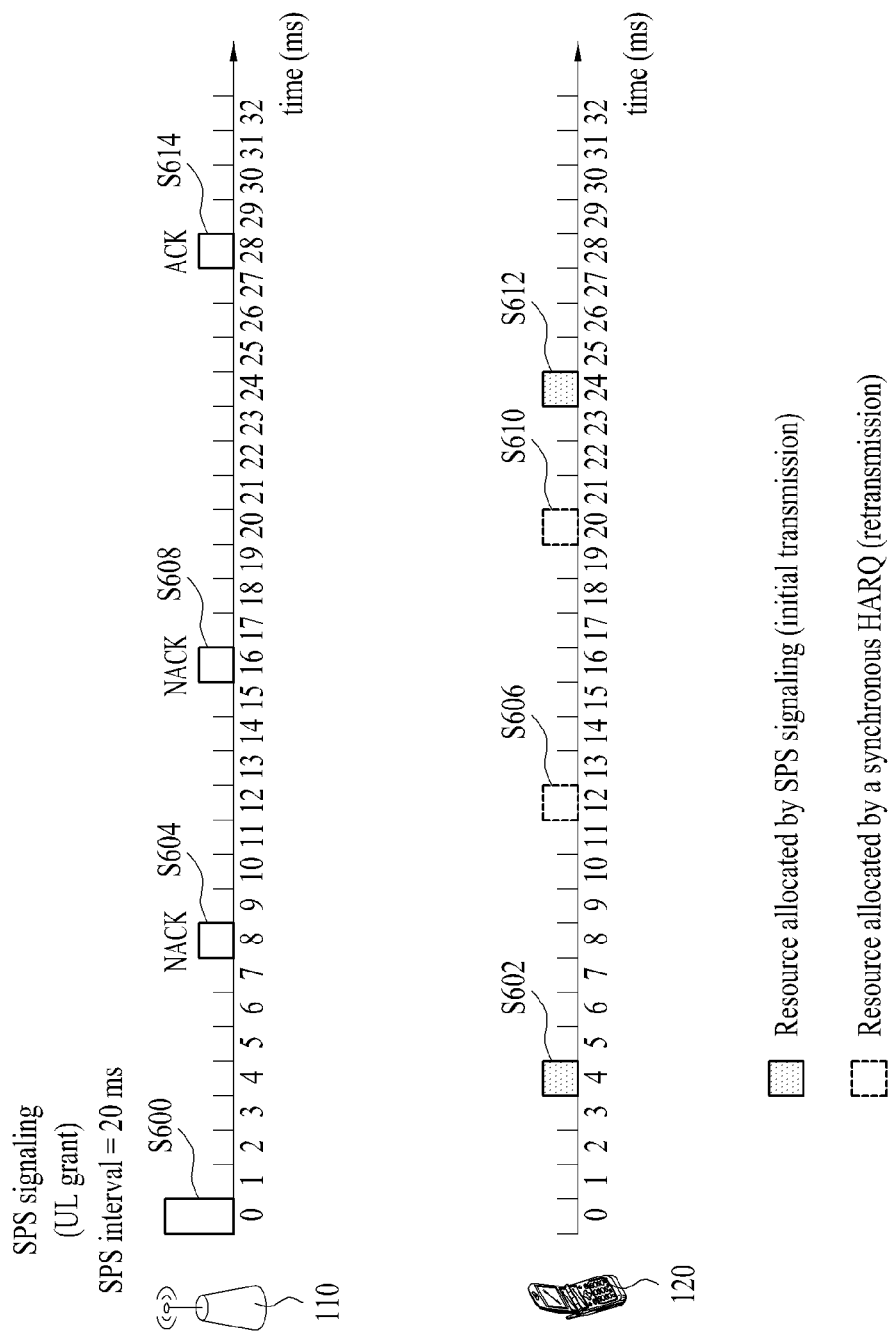
FIG. 6 is a diagram for one example of an operating mechanism of UL SPS (semi-persistent scheduling).

FIG. 6 is a diagram for one example of an operating mechanism of UL SPS (semi-persistent scheduling). According to this example, assume that a resource allocation interval of SPS is set to 20 ms via higher layer signaling (e.g., RRC signaling).

Referring to FIG. 6, a base station 110 transmits SPS PDCCH indicating SPS activation to a user equipment [S600]. According to the present example, the SPS PDCCH may contain UL grant information. In this case, the user equipment 120 receives specific RB, MCS and the like designed by the SPS PDCCH in 20 ms-interval from the timing of receiving a UL grant message by SPS signaling. Hence, the user equipment 120 may be able to perform a UL transmission every 20 ms using the RB and MCS designated by the SPS PDCCH [S502, S612]. Meanwhile, in case that UL synchronous HARQ is used, a resource for a retransmission is reserved every 8 ms after an initial transmission [S606, S610]. In particular, in case of receiving NACK (negative acknowledgement) for UL data [S604, S608], the user equipment 120 performs a retransmission via the resource reserved for the HARQ retransmission [S606, S610]. On the contrary, if the user equipment 120 succeeds in the initial transmission (i.e., if ACK (acknowledgement) is received for the UL data) [S614], the resource reserved for HARQ retransmission becomes available for other user equipments.

Carrier Aggregation (CA)

LTE-A system adopts the carrier aggregation (or bandwidth aggregation) technology that uses wider UL/DL bandwidth in a manner of gathering a plurality of UL/DL frequency blocks to use a broader frequency band. In this case, each of the frequency blocks is transmitted using CC (component carrier). In particular, the terminology 'component carrier (CC)' may be substituted with such an equivalent terminology as a cell, a frequency block and the like.

Figure 7:
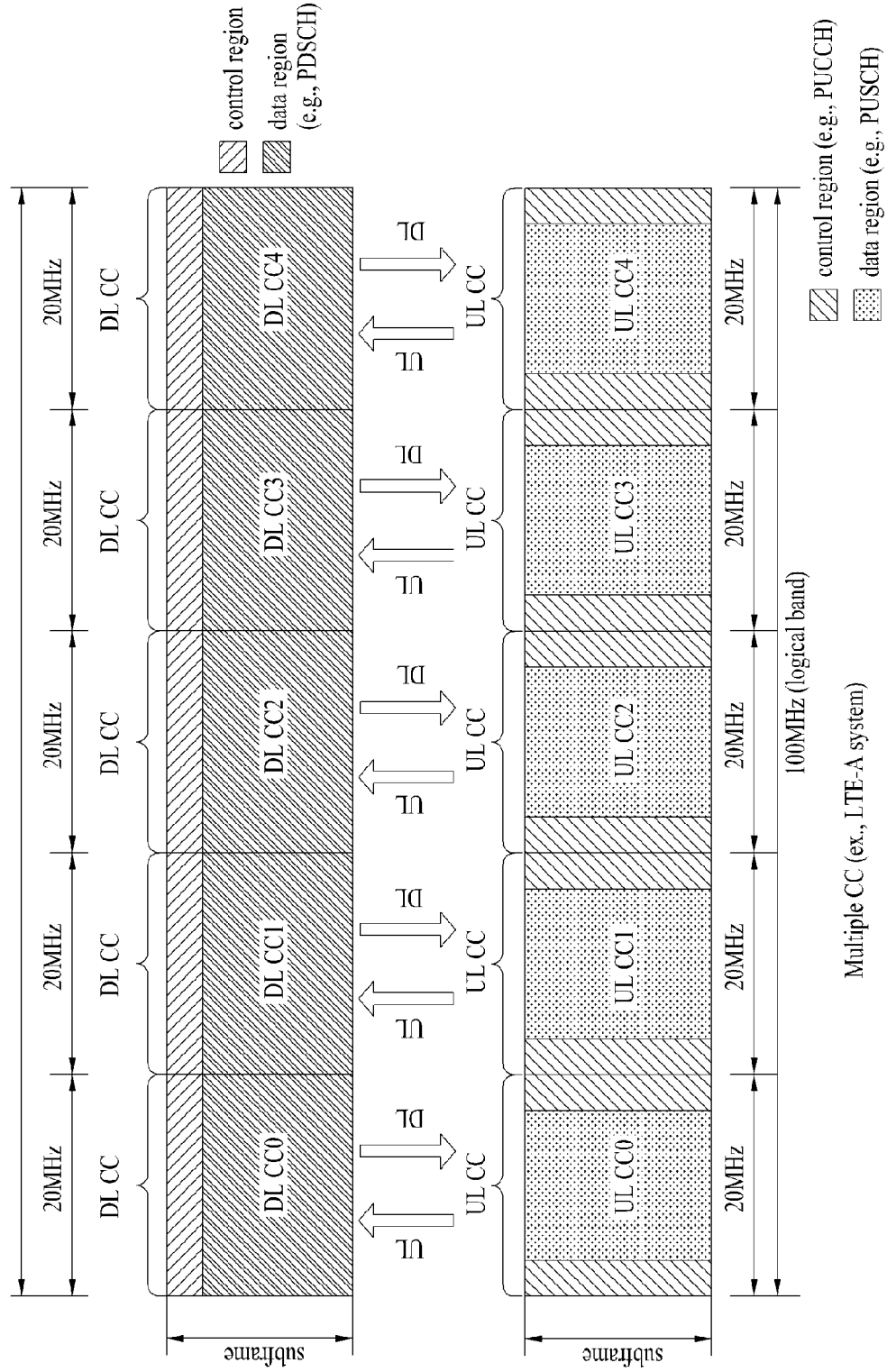
FIG. 7 is a diagram for one example of performing a communication in a configuration of multiple component carriers.

FIG. 7 shows one example of a carrier aggregation (CA) communication system.

Referring to FIG. 7, it may be able to support a broader UL/DL bandwidth by aggregating a plurality of UL/DL CCS (component carriers). The CCs may be configured adjacent to or non-adjacent from each other. A bandwidth of each of the CCs may be determined independently. Moreover, it may be possible to configure an asymmetric carrier aggregation in which the number of UL CCs and the number of DL CCs are different from each other. Meanwhile, control information may be configured to be transmitted or received on specific CC only. This specific CC may be named a primary CC and other CCs may be named secondary CCs. If cross-carrier scheduling is applied, DL/UL scheduling PDCCH is transmitted on DL CC #0 and the corresponding PDSCH/PUSCH may be transmitted on a different CC (i.e., DL CC other than DL CC #1, UL CC non-linked to DL CC #1, etc.). CI (carrier indication) information indicating a CC, to which a scheduling command will be applied for the cross-carrier scheduling, may be contained in the DL/UL scheduling PDCCH. To this end, CIF (CI field) constructed one or several bits may be contained in the DCI. Alternatively, the CI information may be carried on PDCCH in an implicit manner (e.g., CRC mask, scramble, etc.).

Search space for PDCCH may include a common search space and a dedicated search space. In particular, the common search space mainly carries DL/UL scheduling PDCCH applied to all user equipments or a user equipment group in a cell, while the dedicated search space carries DL/UL scheduling PDCCH (UE-dedicated PDCCH) for each user equipment. CI information is not contained in the PDCCH within the common search space but is generally contained in the PDCCH within the dedicated search space. Within a range of not raising PDCCH blind decoding complexity, a portion of the UE-dedicated PDCCHs may be transmitted via the common search space. In case of LTE, DCI format 0/1A corresponds to this PDCCH. Due to this reason, the PDCCH for the SPS scheduling may be transmitted any one of the common search space and the dedicated search space. Therefore, both of the PDCCH having no CI information and the PDCCH having the CI information may be supported for the SPS scheduling. Due to another reason, both of the PDCCH having no CI information and the PDCCH having the CI information may be supported for the SPS scheduling.

According to a related art, in case of dynamic PDSCH/PUSCH scheduling, the PDCCH having no CI information (e.g., PDCCH in a common search space) may be always applied to DL CC having carried the PDCCH or UL CC semi-statically linked to the corresponding DL CC. Yet, in case that the PDCCH for the activation/reactivation/release of SPS PDSCH/PUSCH does not contain CI information, how to handle the SPS PDCCH has not been defined. Therefore, the present invention proposes a method of efficiently performing a scheduling operation related to SPS PDCCH and a user equipment operation in accordance with a presence or non-presence of CI information in a configuration having a plurality of component carriers (CCs) aggregated therein.

1$^{st}$ Embodiment

According to the present embodiment, if CI information exists in SPS PDCCH, DL/UL carrier for SPS transmission is configured/changed in accordance with the CI information. Yet, if the CI information does not exist in the SPS PDCCH, carrier for the SPS transmission is configured/changed into DL carrier having carried the SPS PDCCH [DL SPS] or UL carrier linked with the DL carrier having carried the SPS PDCCH [UL SPS].

Figure 8:
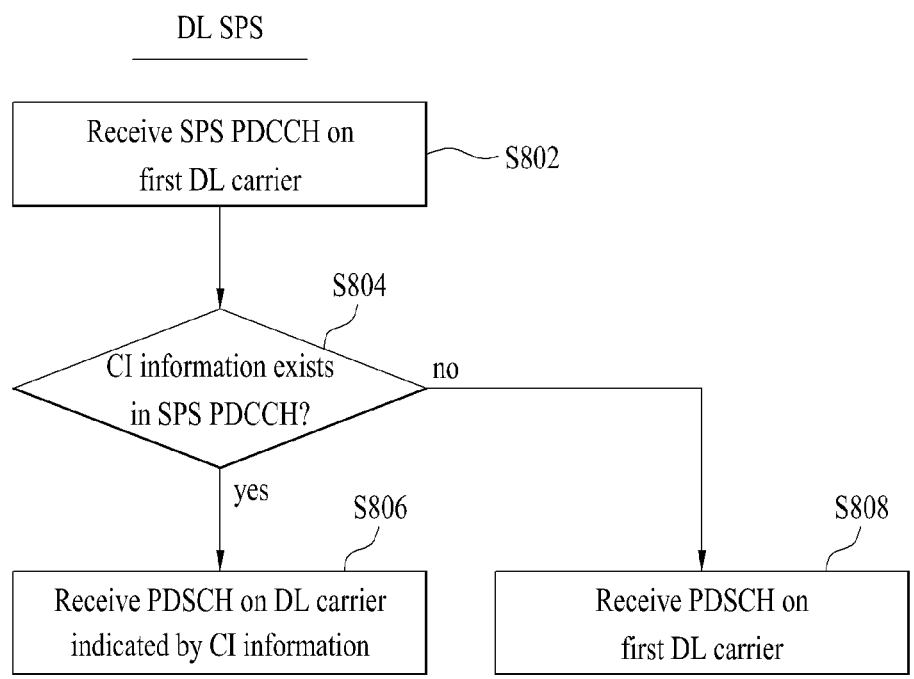
FIGS. 8 to 10 show examples of an SPS operation according to one embodiment of the present invention.

FIG. 8 shows one example of a flowchart of DL SPS according to a 1$^{st}$ embodiment of the present invention. For clarity, the flowchart is provided in aspect of a user equipment. Yet, a counter operation is performed by a base station as well.

Referring to FIG. 8, a user equipment receives SPS PDCCH on a first DL carrier [S802]. In doing so, the SPS PDCCH may include PDCCH for SPS activation/reactivation/release. In this specification, the SPS PDCCH may mean the PDCCH verified through an SPS PDCCH validation procedure. In the following description, the SPS PDCCH validation is explained in brief. First of all, in LTE, if CRC of PDCCH is masked with SPS C-RNTI and an NDI (new data indicator) field is set to 0, a user equipment performs SPS PDCCH validation on the corresponding PDCCH. If the field of DCI format meets a previously defined value, the user equipment validates the corresponding PDCCH with the SPS PDCCH (or DCI).

Table 3 shows field values of DCI for SPS activation (or reactivation) PDCCH validation.

TABLE 3

|  | DCI format 0 | DCI format 1/1A | DCI format 2/2A |
| --- | --- | --- | --- |
| TPC command for scheduled PUSCH | set to '00' | N/A | N/A |
| Cyclic shift DM RS | set to '000' | N/A | N/A |
| Modulation and coding scheme and redundancy version | MSB is set to '0' | N/A | N/A |
| HARQ process number | N/A | FDD: set to '000' TDD: set to '0000' | FDD: set to '000' TDD: set to '0000' |
| Modulation and coding scheme | N/A | MSB is set to '0' | For the enabled transport block: MSB is set to '0' |
| Redundancy version | N/A | set to '00' | For the enabled transport block: set to '00' |

N/A: Not Available

If the CI information exists in the received SPS PDCCH [S804], the user equipment may apply the SPS PDCCH to a DL carrier indicated by the CI information. In particular, the user equipment receives the SPS PDCCH on the DL carrier indicated by the CI information using the RB/assignment information and the like indicated by the SPS PDCCH [S806]. On the contrary, if the CI information does not exist in the SPS PDCCH [S804], the user equipment may apply the SPS PDCCH to the DL carrier (i.e., first DL carrier) having the SPS PDCCH received thereon. In particular, the user equipment receives the SPS PDCCH on the DL carrier having the SPS PDCCH received thereon using the RB/MCS assignment information and the like indicated by the SPS PDCCH [S808]. For clarity, although FIG. 8 shows the example by mainly concerning DL SPS, the same contents may be applicable to UL SPS. For instance, in case of the UL SPS, the user equipment transmits PUSCH on the UL carrier indicated by the CI information in the step S806. And, the user equipment transmits PUSCH on the UL carrier linked with the DL carrier (i.e., the first DL carrier) on which the SPS PDCCH has been received.

Figure 9:
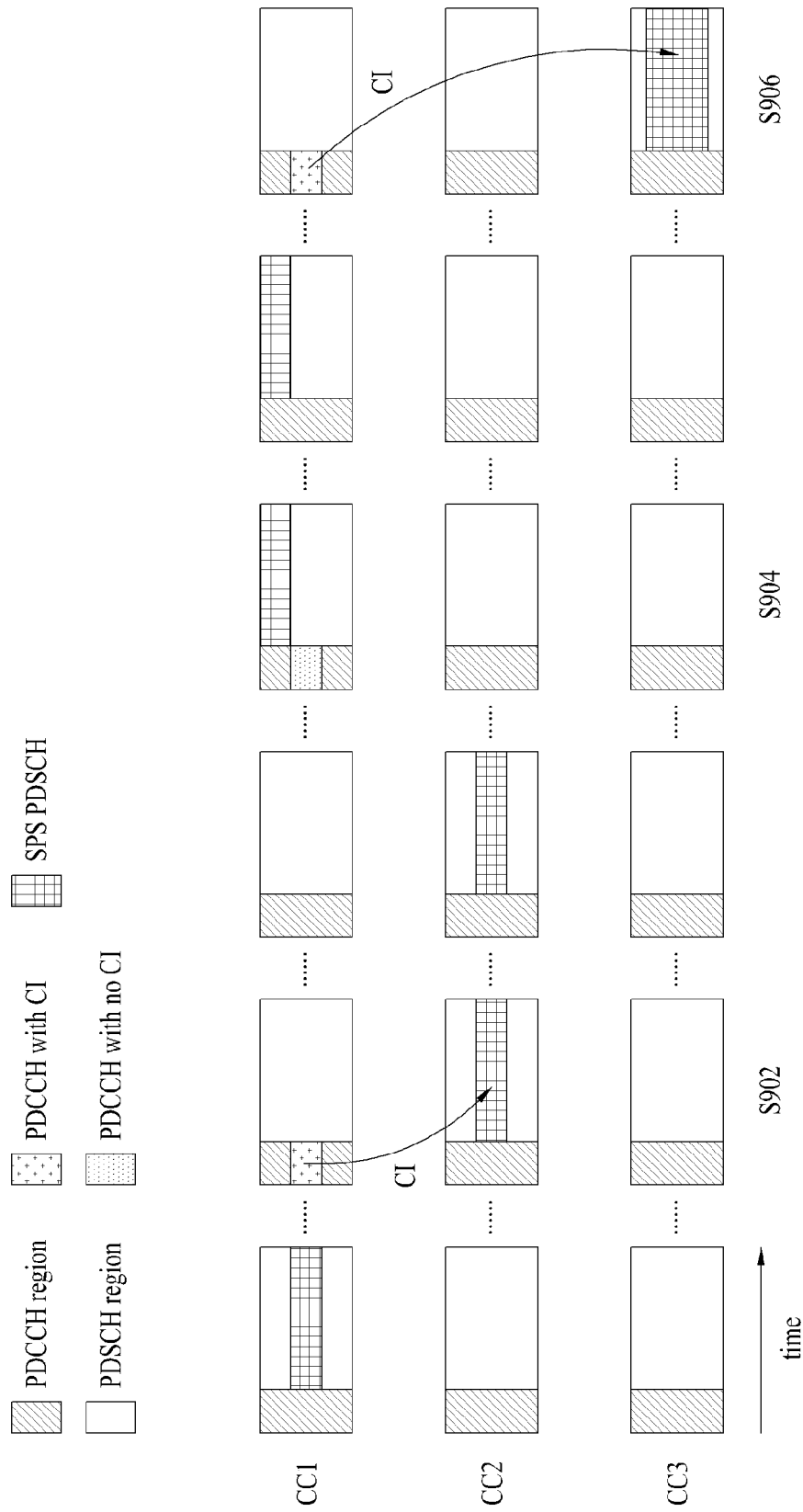

FIG. 9 shows one example of a DL SPS operation according to a 1$^{st}$ embodiment. For clarity, FIG. 9 shows that SPS PDCCH is carried on CC1, the corresponding drawing is just one example, by which the number, position and type of CC capable of carrying the SPS PDCCH may be especially non-limited.

Referring to FIG. 9, if there is CI information in SPS PDCCH, PDSCH according to SPS is received on DL carrier (e.g., CC2, CC3, etc.) indicated by the CI information [S902, S906]. On the contrary, if CI information does not exist in SPS PDCCH, PDSCH according to SPS is received on a DL carrier (e.g., CC1) having SPS PDCCH carried thereon [S904]. Frequency resource (e.g., RB) and/or MCS assignment for SPS activation/reactivation may be maintained until an SPS release or a new SPS reactivation occurs. And, the resource and/or MCS assignment for SPS activation/reactivation may be maintained until a corresponding HARQ transmission is completed. Moreover, the resource and/or MCS assignment for the SPS activation/reactivation may be applicable to a corresponding DL/UL subframe only.

Figure 10:
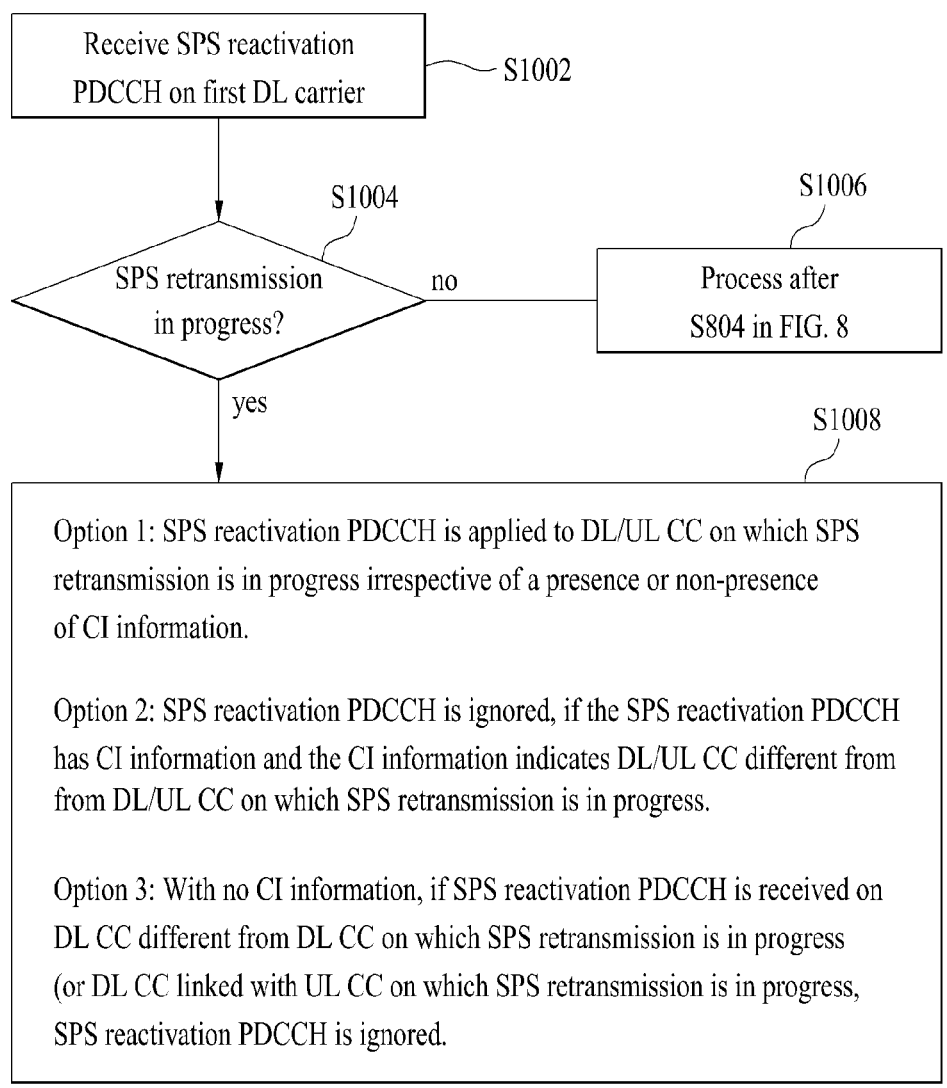

FIG. 10 shows one example of a flowchart of SPS in consideration of SPS retransmission. Assume that it is impossible for DL/UL HARQ process and HARQ buffer management to be mixed between DL/UL carriers different from each other. Although the flowchart is provided in aspect of a user equipment, counter operations may be performed by a base station.

Referring to FIG. 10, a user equipment receives PDCCH (e.g., SPS reactivation PDCCH) for SPS reactivation on a first DL carrier [S1002]. If an SPS retransmission is not in progress [S1004], the user equipment performs the steps after the former step S804 shown in FIG. 8 [S1006]. On the contrary, if the SPS retransmission is in progress [S1004], the user equipment may be able to perform such an operation as one of the following operations [S1008].

Option 1: SPS reactivation PDCCH is applied to a DL/UL carrier on which SPS retransmission is in progress irrespective of a presence or non-presence of CI information in the SPS reactivation PDCCH.

Option 2: SPS reactivation PDCCH is ignored, if the SPS reactivation PDCCH has CI information and the CI information indicates a DU/UL carrier different from a DL/UL carrier on which SPS retransmission is in progress.

Option 3: SPS reactivation PDCCH is ignored, when the SPS reactivation PDCCH does not have CI information, if the SPS reactivation PDCCH is transmitted on a DL carrier different from a DL carrier on which SPS retransmission is in progress [DL SPS] or a DL carrier different from a DL carrier linked with a UL carrier on which SPS retransmission is in progress [UL SPS].

2$^{nd}$ Embodiment

According to the present embodiment, if CI information exists in SPS PDCCH, DL/UL carrier for SPS transmission is configured/changed in accordance with the CI information. Yet, if the CI information does not exist in the SPS PDCCH, carrier for the SPS transmission is configured/changed into DL carrier having the SPS transmission performed thereon recently [DL SPS] or UL carrier having the SPS transmission performed thereon recently [UL SPS]. So to speak, if the CI information does not exist in the SPS PDCCH, SPS DL/UL scheduling information is applied to the DL/UL carrier having the SPS transmission performed thereon recently.

Figure 11:
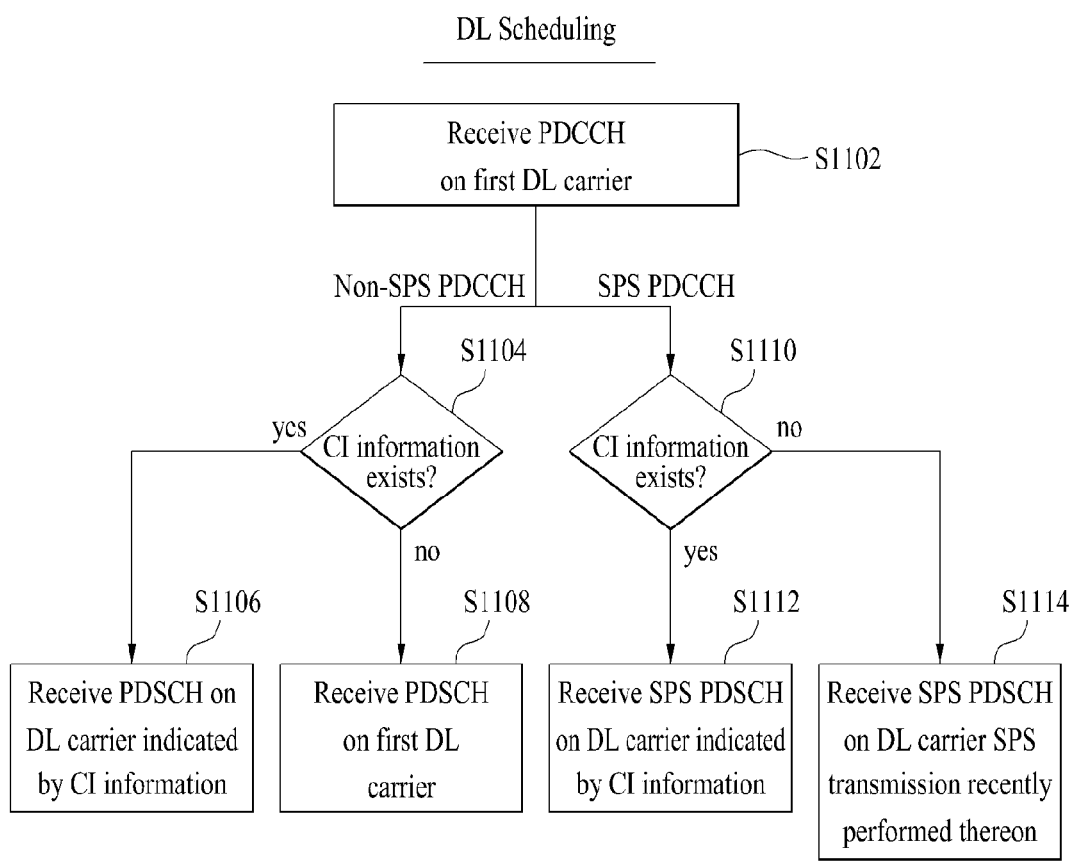
FIGS. 11 to 13 show examples of an SPS operation according to another embodiment of the present invention.

FIG. 11 shows one example of a flowchart of DL scheduling according to a second embodiment of the present invention. For clarity, the flowchart is provided in aspect of a user equipment. Yet, a counter operation is performed by a base station as well.

Referring to FIG. 11, a user equipment receives PDCCH on a first DL carrier [S1102]. Thereafter, an operation of the user equipment varies depending on whether the received PDCCH is a non-SPS PDCCH or an SPS-PDCCH. In this specification, the non-SPS PDCCH means a PDCCH for dynamic scheduling and CRC is masked with RNTI other than C-RNTI. For instance, the CRC of the non-SPS PDCCH may be masked with one of C-RNTU, P-RNTI, SI-RNTI and RA-RNTI, and more preferably, with C-RNTI. On the other hand, the SPS PDCCH means an SPS validated PDCCH and may be masked with SPS C-RNTI.

In case of the non-SPS PDCCH, if the CI information exits in the PDCCH [S1104], the user equipment receives PDSCH on the DL carrier indicated by the CI information [S1106]. On the contrary, if the CI information does not exist in the PDCCH [S1104], the user equipment receives the PDSCH on a carrier (i.e., first carrier) on which the PDCCH was received. Meanwhile, in case of SPS PDCCH, if CI information exists in the SPS PDCCH [S1110], the user equipment receives SPS PDSCH on a DL carrier indicated by the CI information [S1112]. On the contrary, if the CI information does not exist in the SPS PDCCH [S1110], the user equipment receives SPS PDSCH on a DL carrier having an SPS transmission performed thereon recently [S1114].

For clarity, although FIG. 11 shows the example by mainly concerning DL SPS, the same contents may be applicable to UL SPS. For instance, in case of the UL SPS, the user equipment transmits PUSCH on the UL carrier indicated by the CI information in the step S1106. And, in the step S1108, the user equipment transmits PUSCH on a UL carrier linked with the DL carrier (i.e., the first DL carrier) on which the SPS PDCCH was received. The user equipment transmits PUSCH on the UL carrier indicated by the CI information in the step S1112. And, in the step S1114, the user equipment transmits the SPS PUSCH on the UL carrier on which the SPS transmission has been performed recently.

According to the present embodiment, SPS PDCCH (no CI information) is usefully usable to change RB/MCS assignment information and the like only while an SPS transmission performed carrier is maintained intact. If the SPS transmission performed carrier is indicated, since a separate CI information is not required, it may be able to reduce a DCI size. Moreover, since the PDCCH with no CI information is transmittable via a common search space, it may be able to raise a degree of freedom in PDCCH scheduling.

Figure 12:
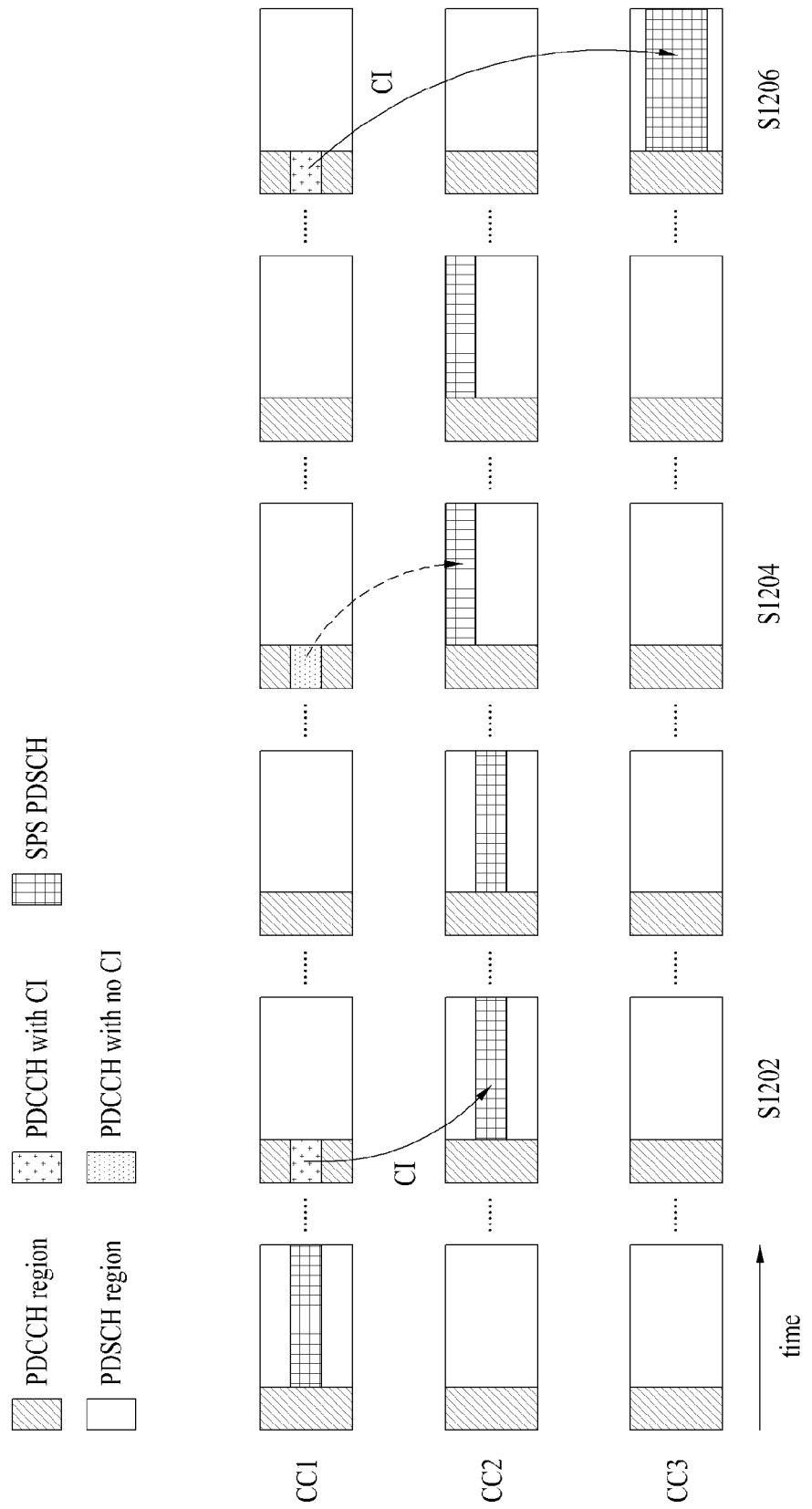

FIG. 12 shows one example of a DL SPS operation according to a second embodiment. For clarity, FIG. 12 shows that SPS PDCCH is carried on CC1, the corresponding drawing is just one example, by which the number, position and type of CC capable of carrying the SPS PDCCH may be especially non-limited.

Referring to FIG. 12, if there is CI information in SPS PDCCH, PDSCH according to SPS is received on DL carrier (e.g., CC2, CC3, etc.) indicated by the CI information [S1202, S1206]. On the contrary, if CI information does not exist in SPS PDCCH, PDSCH according to SPS is received on a DL carrier (e.g., CC2) on which the SPS transmission has been recently performed [S1204]. Resource and/or MCS assignment for SPS activation/reactivation may be maintained until an SPS release or a new SPS reactivation occurs. And, the resource and/or MCS assignment for the SPS activation/reactivation may be maintained until a corresponding HARQ transmission is completed. Moreover, the resource and/or MCS assignment for the SPS activation/reactivation may be applicable to a corresponding DL/UL subframe only.

Figure 13:
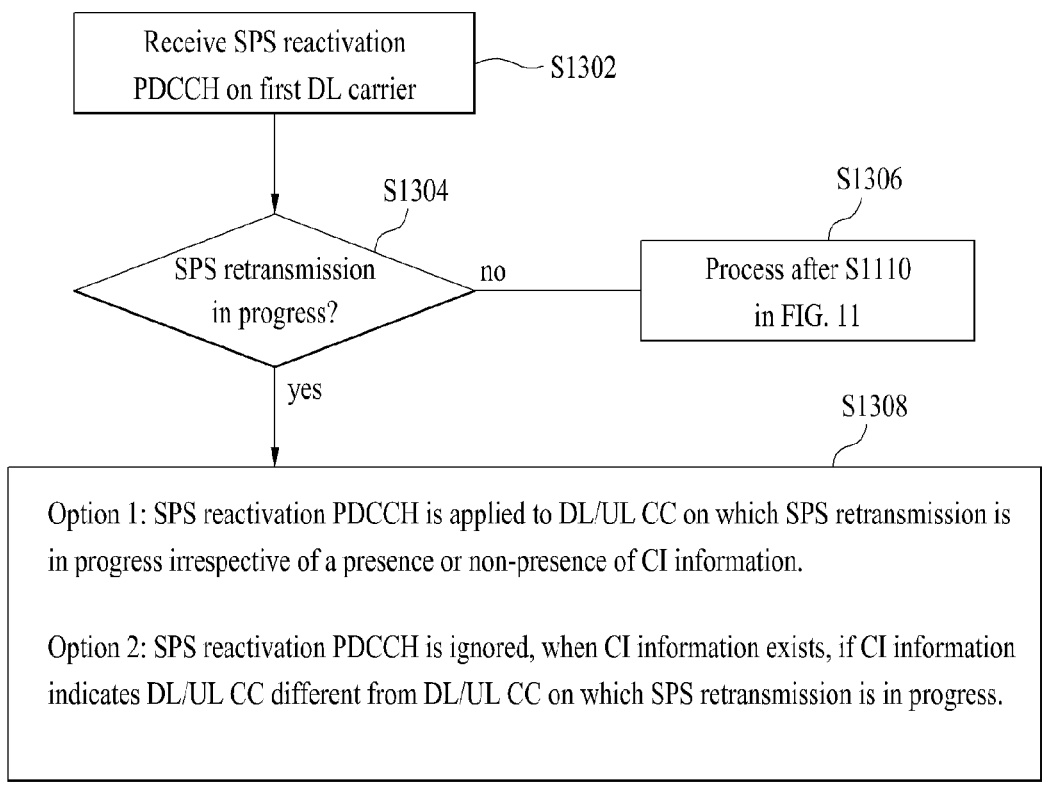

FIG. 13 shows one example of a flowchart of SPS in consideration of SPS retransmission. Assume that it is impossible for DL/UL HARQ process and HARQ buffer management to be mixed between DL/UL carriers different from each other. Although the flowchart is provided in aspect of a user equipment, counter operations may be performed by a base station.

Referring to FIG. 13, a user equipment receives PDCCH (e.g., SPS reactivation PDCCH) for SPS reactivation on a first DL carrier [S1302]. If an SPS retransmission is not in progress [S1304], the user equipment performs the steps after the former step S1110 shown in FIG. 11 [S1306]. On the contrary, if the SPS retransmission is in progress [S1304], the user equipment may be able to perform such an operation as one of the following operations [S1308].

Option 1: SPS reactivation PDCCH is applied to a DL/UL carrier on which SPS retransmission is in progress irrespective of a presence or non-presence of CI information in the SPS reactivation PDCCH.

Option 2: SPS reactivation PDCCH is ignored, if the SPS reactivation PDCCH has CI information and the CI information indicates a DU/UL carrier different from a DL/UL carrier on which SPS retransmission is in progress.

$3^{rd}$ Embodiment

According to the present embodiment, if CI information exists in SPS PDCCH, DL/UL carrier for SPS transmission is configured/changed in accordance with the CI information. Yet, if the CI information does not exist in the SPS PDCCH, a carrier for the SPS transmission is configured/changed into a previously defined specific DL carrier (e.g., primary DL CC, DL PCC [DL SPS] or a previously defined specific UL carrier (e.g., primary UL CC, UL PCC) [UL SPS]. So to speak, if the CI information does not exist in the SPS PDCCH, SPS DL/UL scheduling information is applied to the previously defined specific DL/UL carrier (e.g., primary DL/UL CC). PCC may be semi-statically configurable (or reconfigurable) by higher layer signaling (e.g., RRC signaling). And, DL PCC and UL PCC may have a previously defined linkage in-between.

Figure 14:
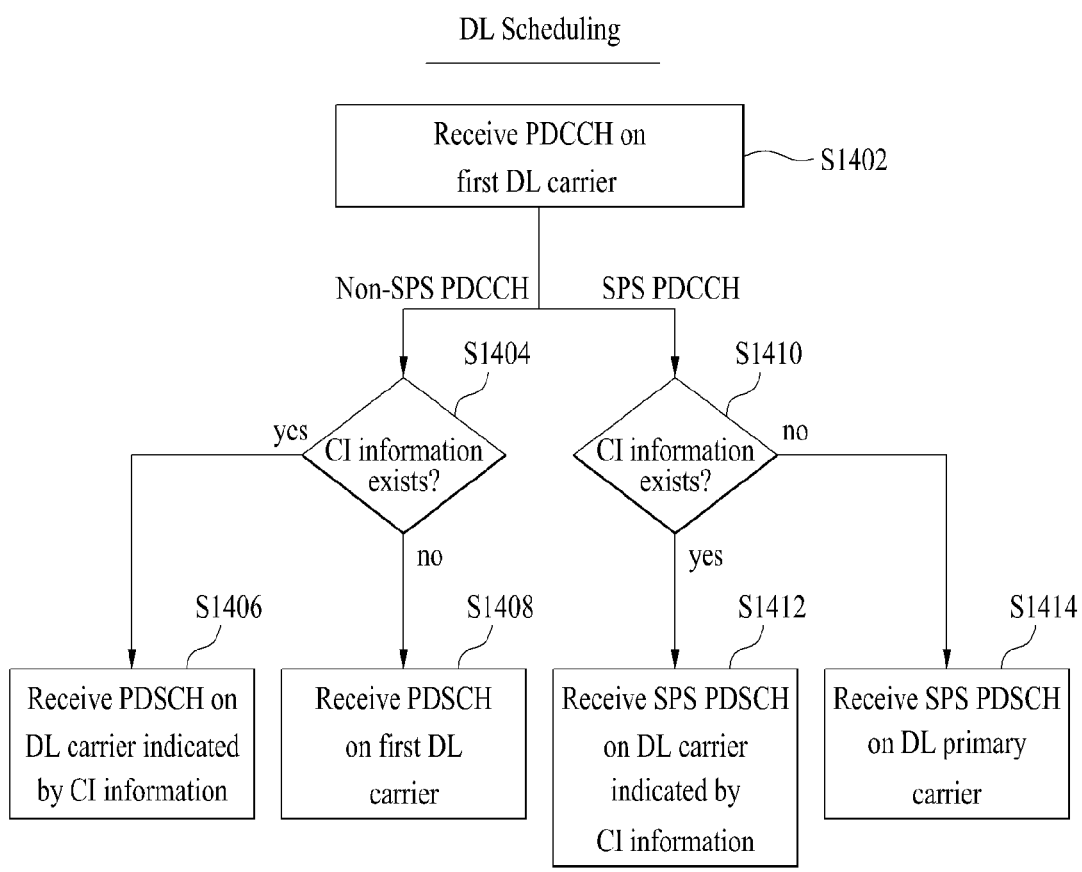
FIGS. 14 to 16 show examples of an SPS operation according to further of the present invention.

FIG. 14 shows one example of a flowchart of DL scheduling according to a $3^{rd}$ embodiment of the present invention. For clarity, the flowchart is provided in aspect of a user equipment. Yet, a counter operation is performed by a base station as well.

Referring to FIG. 14, a user equipment receives PDCCH on a first DL carrier [S1402]. Thereafter, an operation of the user equipment varies depending on whether the received PDCCH is, a non-SPS PDCCH or an SPS-PDCCH. In case of the non-SPS PDCCH, if the CI information exits in the PDCCH [S1404], the user equipment receives PDSCH on the DL carrier indicated by the CI information [S1406]. On the contrary, if the CI information does not exist in the PDCCH [S1404], the user equipment receives the PDSCH on a carrier (i.e., first carrier) on which the PDCCH was received. Meanwhile, in case of the SPS PDCCH, if CI information exists in the SPS PDCCH [S1410], the user equipment receives SPS PDSCH on a DL carrier indicated by the CI information [S1412]. On the contrary, if the CI information does not exist in the SPS PDCCH [S1410], the user equipment receives SPS PDSCH on a previously defined specific DL carrier (e.g., DL PCC) [S1414].

For clarity, although FIG. 14 shows the example by mainly concerning DL SPS, the same contents may be applicable to UL SPS. For instance, in case of the UL SPS, the user equipment transmits PUSCH on the UL carrier indicated by the CI information in the step S1406. And, in the step S1408, the user equipment transmits PUSCH on a UL carrier linked with the DL carrier (i.e., the first DL carrier) on which the SPS PDCCH was received. The user equipment transmits SPS PUSCH on the UL carrier indicated by the CI information in the step S1412. And, in the step S1414, the user equipment transmits the SPS PUSCH on the previously defined specific UL carrier (e.g., UL PCC).

According to the present embodiment, SPS PDCCH (no CI information) is usefully usable to change RB/MCS assignment information and the like only while an SPS transmission performed carrier is changed into or maintained as a primary carrier. If the primary carrier is indicated for the SPS transmission, since a separate CI information is not required, it may be able to reduce a DCI size. Moreover, since the PDCCH with no CI information is transmittable via a common search space, it may be able to raise a degree of freedom in PDCCH scheduling.

Figure 15:
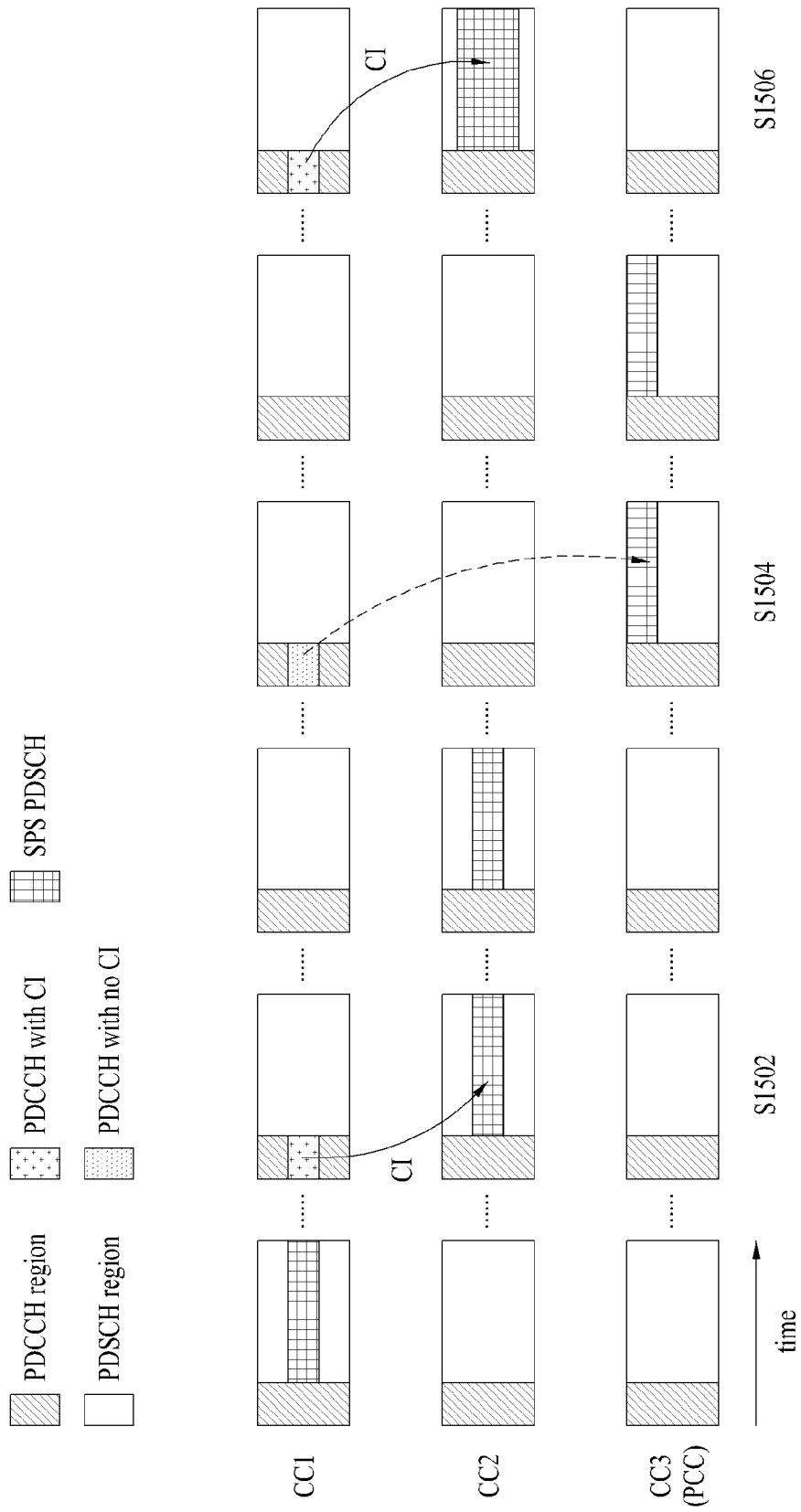

FIG. 15 shows one example of a DL SPS operation according to a $3^{rd}$ embodiment. For clarity, FIG. 15 shows that SPS PDCCH is carried on CC1, the corresponding drawing is just one example, by which the number, position and type of CC capable of carrying the SPS PDCCH may be especially non-limited.

Referring to FIG. 15, if there is CI information in SPS PDCCH, PDSCH according to SPS is received on DL carrier (e.g., CC2) indicated by the CI information [S1502, S1506]. On the contrary, if CI information does not exist in SPS PDCCH, PDSCH according to SPS is received on a DL carrier (e.g., CC3) on which the SPS transmission has been recently performed [S1504]. Resource and/or MCS assignment for SPS activation/reactivation may be maintained until an SPS release or a new SPS reactivation occurs. And, the resource and/or MCS assignment for the SPS activation/reactivation may be maintained until a corresponding HARQ transmission is completed. Moreover, the resource and/or MCS assignment for the SPS activation/reactivation may be applicable to a corresponding DL/UL subframe only.

Figure 16:
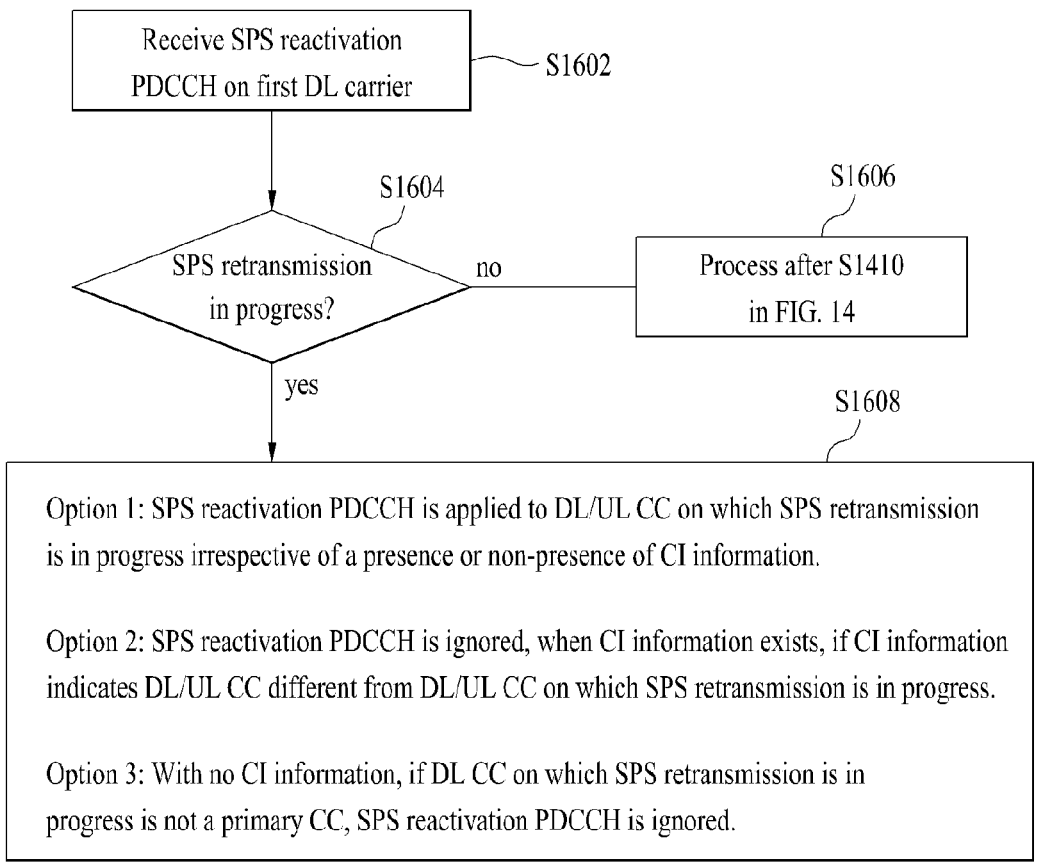

FIG. 16 shows one example of a flowchart of SPS in consideration of SPS retransmission. Assume that it is impossible for DL/UL HARQ process and HARQ buffer management to be mixed between DL/UL carriers different from each other. Although the flowchart is provided in aspect of a user equipment, counter operations may be performed by a base station.

Referring to FIG. 16, a user equipment receives PDCCH (e.g., SPS reactivation PDCCH) for SPS reactivation on a first DL carrier [S1602]. If an SPS retransmission is not in progress [S1604], the user equipment performs the steps after the former step S1410 shown in FIG. 14 [S1606]. On the contrary, if the SPS retransmission is in progress [S1604], the user equipment may be able to perform such an operation as one of the following operations [S1608].

Option 1: SPS reactivation PDCCH is applied to a DL/UL carrier on which SPS retransmission is in progress irrespective of a presence or non-presence of CI information in the SPS reactivation PDCCH.

Option 2: SPS reactivation PDCCH is ignored, if the SPS reactivation PDCCH has CI information and the CI information indicates a DU/UL carrier different from a DL/UL carrier on which SPS retransmission is in progress.

Option 3: SPS reactivation PDCCH is ignored if the SPS reactivation PDCCH does not have CI information and a DL/UL carrier, on which SPS retransmission is being performed, is not a primary carrier.

Figure 17:
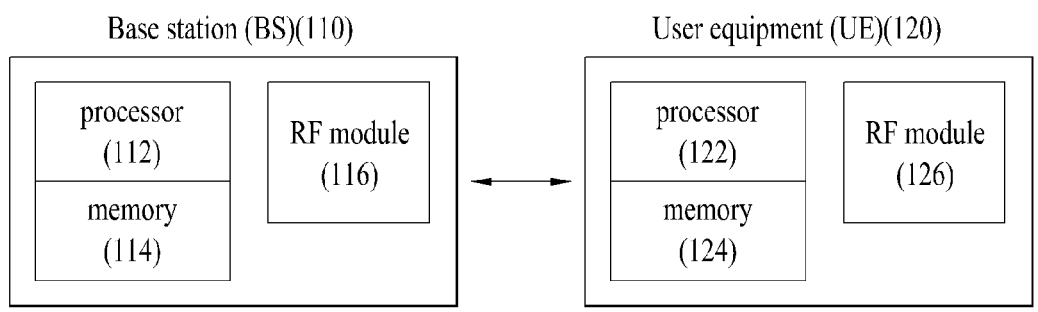
FIG. 17 is a diagram for one example of a base station and a user equipment, to which the present invention is applicable.

FIG. 17 is a diagram for one example of a base station and a user equipment applicable to the present invention.

Referring to FIG. 17, a wireless communication system may include a base station (BS) 110 and a user equipment (UE) 120. If the wireless communication system includes a relay, the base station (BS) 110 or the user equipment (UE) 120 may be substituted with the relay.

The base station 110 may include a processor 112, a memory 114 and a radio frequency (RF) unit 116. The processor 112 may be configured to implement the procedures and/or methods proposed by the present invention. The memory 114 is connected with the processor 112 to store various kinds informations related to operations of the processor 112. The RF unit 116 is connected with the processor 112 and then transmits and/or receives radio signals. The user equipment 120 may include a processor 122, a memory 124 and a radio frequency (RF) unit 126. The processor 122 may be configured to implement the procedures and/or methods proposed by the present invention. The memory 124 is connected with the processor 122 to store various kinds informations related to operations of the processor 122. The RF unit 126 is connected with the processor 122 and then transmits and/or receives radio signals. The base station 110 and/or the user equipment 120 may have a single antenna or multiple antennas.

The above-described embodiments may correspond to combinations of elements and features of the present invention in prescribed forms. And, it may be able to consider that the respective elements or features may be selective unless they are explicitly mentioned. Each of the elements or features may be implemented in a form failing to be combined with other elements or features. Moreover, it may be able to implement an embodiment of the present invention by combining elements and/or features together in part. A sequence of operations explained for each embodiment of the present invention may be modified. Some configurations or features of one embodiment may be included in another embodiment or can be substituted for corresponding configurations or features of another embodiment. And, it is apparently understandable that a new embodiment may be configured by combining claims failing to have relation of explicit citation in the appended claims together or may be included as new claims by amendment after filing an application.

In this disclosure, embodiments of the present invention are described centering on the data transmission/reception relations between a base station and a user equipment. In this disclosure, a specific operation explained as performed by a base station may be performed by an upper node of the base station in some cases. In particular, in a network constructed with a plurality of network nodes including a base station, it is apparent that various operations performed for communication with a user equipment may be performed by a base station or other networks (e.g., relay, etc.) except the base station. In this case, 'base station' can be replaced by such a terminology as a fixed station, a Node B, an eNode B (eNB), an access point and the like. And, 'terminal' may be replaced by such a terminology as a user equipment (UE), a mobile station (MS), a mobile subscriber station (MSS)' and the like.

Embodiments of the present invention may be implemented using various means. For instance, embodiments of the present invention may be implemented using hardware, firmware, software and/or any combinations thereof. In case of the implementation by hardware, one embodiment of the present invention may be implemented by one of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, one embodiment of the present invention may be implemented by modules, procedures, and/or functions for performing the above-explained functions or operations. Software code may be stored in a memory unit and may be then drivable by a processor. The memory unit may be provided within or outside the processor to exchange data with the processor through the various means known to the public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. For instance, the respective configurations disclosed in the aforesaid embodiments of the present invention can be used by those skilled in the art in a manner of being combined with one another. Therefore, the present invention is non-limited by the embodiments disclosed herein but intends to give a broadest scope matching the principles and new features disclosed herein.

INDUSTRIAL APPLICABILITY

Accordingly, the present invention is applicable to wireless access systems. In particular, the present invention is applicable to a method of performing cross-carrier scheduling for SPS (semi-persistent scheduling) in a wireless communication system and apparatus therefor.

What is claimed is:

1. A method of receiving a downlink signal by a user equipment (UE) in a carrier aggregation supportive wireless communication system, the method comprising:
   receiving a semi-persistent scheduling (SPS) physical downlink control channel (PDCCH) having no carrier indication (CI) information via a first carrier among a plurality of carriers,
   determining whether or not a SPS retransmission is in progress, and
   if the SPS retransmission is not in progress on all of the plurality of carriers, reactivating a SPS transmission on a second carrier on which the SPS transmission has been performed most recently among the plurality of carriers,
   wherein the second carrier is different from the first carrier which carries the SPS PDCCH.

2. The method of claim 1, further comprising:
   if the SPS retransmission is in progress on a third carrier different from the first carrier which carries the SPS PDCCH, reactivating the SPS transmission on the third carrier.

3. A user equipment configured to receive a downlink signal in a carrier aggregation supportive wireless communication system, the user equipment comprising:
   means for receiving a semi-persistent scheduling (SPS) physical downlink control channel (PDCCH) having no carrier indication (CI) information via a first carrier among a plurality of carriers,
   means for determining whether or not a SPS retransmission is in progress, and
   means for reactivating a SPS transmission on a second carrier on which the SPS transmission has been performed most recently among the plurality of carriers, if the SPS retransmission is not in progress on all of the plurality of carriers, wherein the second carrier is different from the first carrier which carries the SPS PDCCH.

4. The user equipment of claim 3, further comprising:
means for reactivating the SPS transmission on a third carrier if the SPS retransmission is in progress on the third carrier different from the first carrier which carries the SPS PDCCH.

\* \* \* \* \*